(12) United States Patent
Proefke et al.

(10) Patent No.: US 7,129,597 B2
(45) Date of Patent: Oct. 31, 2006

(54) ADAPTIVE ACTUATION VEHICLE LOCKING SYSTEM AND METHOD

(75) Inventors: David T. Proefke, Madison Heights, MI (US); Thomas E. Utter, Royal Oak, MI (US); Robert C. Baillargeon, Armada, MI (US)

(73) Assignee: General Motor Corporation, Detroit, MI (US)

( * ) Notice: Subject to any disclaimer, the term of this patent is extended or adjusted under 35 U.S.C. 154(b) by 463 days.

(21) Appl. No.: 10/624,738

(22) Filed: Jul. 22, 2003

(65) Prior Publication Data

US 2005/0035658 A1 Feb. 17, 2005

(51) Int. Cl.
*B60L 1/00* (2006.01)

(52) U.S. Cl. .................. 307/10.1; 180/289; 701/49

(58) Field of Classification Search .............. 307/10.1; 180/289; 701/49
See application file for complete search history.

(56) References Cited

U.S. PATENT DOCUMENTS

| | | | | |
|---|---|---|---|---|
| 4,486,806 A | * | 12/1984 | Mochida et al. ............ 361/172 |
| 5,912,631 A | * | 6/1999 | Kusunoki .................. 340/5.64 |
| 6,075,454 A | * | 6/2000 | Yamasaki .................. 340/5.61 |
| 6,133,646 A | * | 10/2000 | Segawa et al. ............ 307/10.1 |
| 2001/0047244 A1 | * | 11/2001 | Harrison et al. ............ 701/213 |
| 2003/0074966 A1 | * | 4/2003 | Fukumura et al. ............ 73/488 |
| 2004/0160126 A1 | * | 8/2004 | Aoki et al. ................. 307/10.2 |

* cited by examiner

*Primary Examiner*—Robert L. Deberadinis
*Assistant Examiner*—Daniel Cavallari
(74) *Attorney, Agent, or Firm*—Laura C. Hargitt

(57) ABSTRACT

Methods and system are provided for an adaptive vehicle locking system. The system includes a plurality of vehicle door locks, each configured to lock and unlock in response to a first signal, a plurality of sensors each configured to sense opening and closing of an associated vehicle door and to send second signals in response to opening and closing of the associated vehicle door, and a lock requester configured to send a third signal. A control module that includes a memory for storing a history of the second signals and a timer adaptively settable in response to the history of the second signals is configured to receive the second signals from the plurality of sensors and the third signal from the lock requester. The control module is also configured to send a first signal to the plurality of vehicle door locks causing the vehicle door locks to lock in response to timing out of the timer following receipt of the third signal.

20 Claims, 3 Drawing Sheets

ADAPTIVE ACTUATION VEHICLE LOCKING SYSTEM AND METHOD

FIELD OF THE INVENTION

The present invention generally relates to a locking system and method for a motor vehicle, and more particularly relates to a motor vehicle adaptive actuation locking system and to a method for its use.

BACKGROUND OF THE INVENTION

In traditional vehicular power door locks, door locking is limited to two different approaches when a lock request is made and a door or doors are open. The locking system either immediately locks all doors upon receipt of the operator lock request, or it locks all the doors following a time delay after the open door or doors are closed. Immediately locking all doors upon operator request is often an inconvenience if the driver or passenger of the vehicle needs to retrieve something (such as a child, a briefcase, etc.) from the vehicle and must open a closed door to do so. In this situation, a time delay between the closing of the door or doors and lock activation is much more advantageous than immediately activating the door locks In a lock delay system, the length of the time delay following door closure, but prior to lock activation, may be preset to any duration. A long time delay is more convenient than a short time delay, giving passengers adequate time to open and close the vehicle's doors and retrieve objects before lock activation. On the other hand, a short time delay is more secure than a long time delay, making the vehicle less likely to be entered by an unauthorized user. The length of the time delay, which may be set at the factory, is not otherwise easily adjusted, however, and it currently cannot adapt to different users or uses. One driver of the vehicle may typically require no time delay, while another driver may typically need a very long delay. Additionally, in those situations in which the driver or passenger opens several doors, the current system does not change the delay between different door openings; the time delay (if any) is the same for each opening and closing. Even if the driver or passenger requires less time to open a second door than to open the first door, the preset locking system provides the same delay for each door opening.

Accordingly, a need exists for a vehicle locking system with adaptive actuation that tailors the time delay between door or doors closing and vehicle locking to individual drivers and situations. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for an adaptive vehicle locking system. The system includes a plurality of vehicle door locks, each configured to lock and unlock in response to a first signal, a plurality of sensors each configured to sense opening and closing of an associated vehicle door and to send second signals in response to opening and closing of the associated vehicle door, and a lock requester configured to send a third signal. A control module that includes a memory for storing a history of the second signals and a timer adaptively settable in response to the history of the second signals is configured to receive the second signals from the plurality of sensors and the third signal from the lock requester. The control module is also configured to send a first signal to the plurality of vehicle door locks causing the vehicle door locks to lock in response to timing out of the timer following receipt of the third signal. In accordance with one embodiment of the invention, a method for adaptively actuating a vehicle locking system for locking the doors of a vehicle comprises setting a timer to an adaptive door lock delay time in response to a history of vehicle door openings and closings. After initiating a door lock request, the timer is started and the doors of the vehicle are locked at the expiration of the delay time.

BRIEF DESCRIPTION OF THE DRAWINGS

The present invention will hereinafter be described in conjunction with the following drawing figures, wherein like numerals denote like elements, and wherein FIG. 1 schematically illustrates, in overhead view, a four door vehicle in which the vehicle locking system with adaptive actuation is employed.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A vehicle locking system with adaptive actuation, in accordance with an embodiment of the invention, utilizes a central body control module with adaptive logic to adapt the time between lock request and lock activation in response to door opening/door closing patterns of a particular driver. The body control module acts to shorten or lengthen the time delay between when a door or doors are closed (following a lock request) and the locking of the vehicle (lock activation), depending on current and historical input conditions. This adaptive system intervenes in vehicle locking only when a lock request is made when a door or doors are open. The vehicle locking system, the various embodiments of which are explained more fully below, generally works as follows: a door (this will generally but not necessarily be the driver's door) is opened and a lock request is made. After that door is closed, the body control module implements an adaptive delay that delays activation of the vehicle door locks. Following the delay, the locks are activated and the doors are locked.

Figure 1:
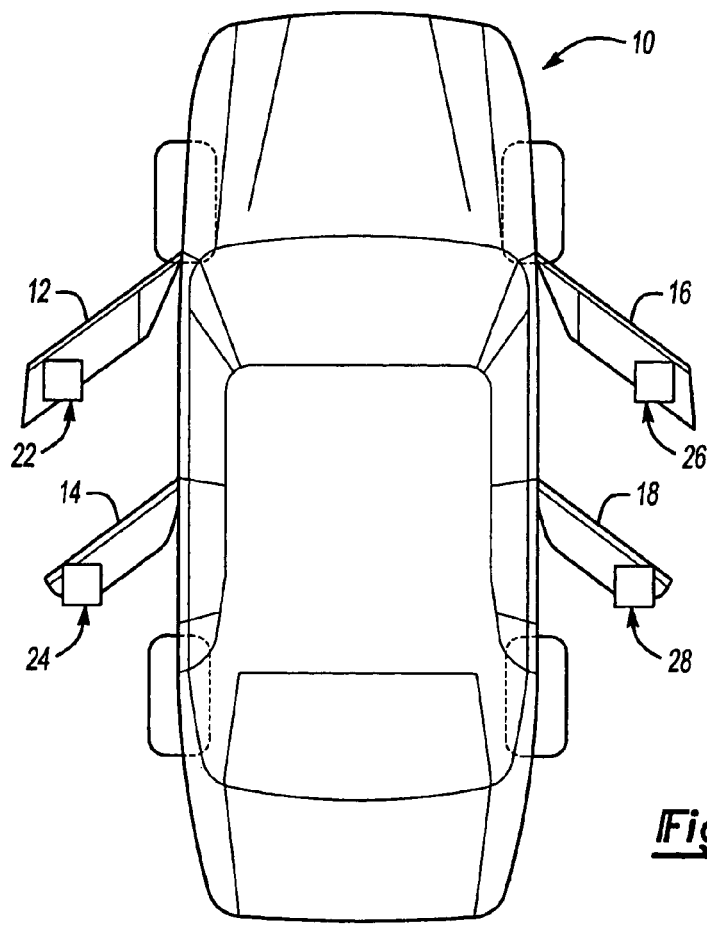

FIG. 1 schematically illustrates an overhead view of a four-door vehicle 10 employing an embodiment of the invention. Vehicle 10 has a front left door 12 with front left door lock 22, front right door 16 with front right door lock 26, rear left door 14 with rear left door lock 24, and rear right door 18 with rear right door lock 28. Although the invention is described herein in application to a four-door vehicle, the invention is applicable to vehicles with more or less than four doors.

Figure 2:
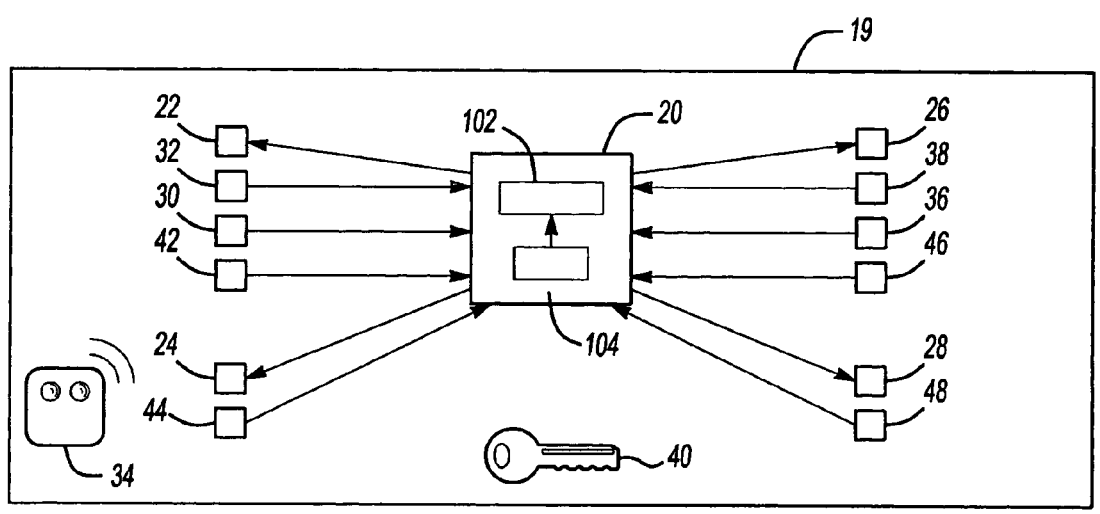
FIG. 2 schematically illustrates a vehicle locking system with adaptive actuation in accordance with an embodiment of the invention.

FIG. 2 schematically illustrates a vehicle locking system 19 with adaptive actuation in accordance with an embodiment of the invention. A body control module 20 is configured to send command signals to front left door lock 22, front right door lock 26, rear left door lock 24, and rear right door lock 28. The body control module may be, for example, a computer chip, a portion of the vehicle's system computer, or the like. The body control module includes, in addition to a processing unit, a plurality of timers and a memory. The memory can be, for example, an electrically erasable programmable read only memory, (EEPROM), FLASH memory, or the like. The timers can be any well known timer circuits or algorithms, and preferably include a lock delay timer, a door unlock timer, and a door open timer. At least one of the timers, the lock delay timer, is configured, as will be explained below, to be adaptive in response to input from the memory. The four door locks are each configured to be locked or unlocked in response to the command signals received from body control module 20. The body control module is also configured to receive signals from power door lock switches 32 and 38 located in the front left door and front right door, respectively, key door lock switches 30 and 36, also located in the front left door and the front right door, respectively, or wireless transmitter 34. Although wireless transmitter 34 will typically be a remote keyless entry fob, it can also be other wireless devices such as, for example, a cellular phone. Key 40 is used to activate either key door lock switch 30 or 36. A command from any of the door lock switches or the wireless transmitter constitutes a lock request. Body control module 20 is further configured to receive signals regarding whether doors are open or closed from front left door sensor 42, front right door sensor 46, rear left door sensor 44, and rear right door sensor 48. The signals the body control module sends and receives from the door locks, the door sensors, and the door lock switches may be sent, for example, through a local area network (LAN), a wireless system network, or the like.

Figure 3:
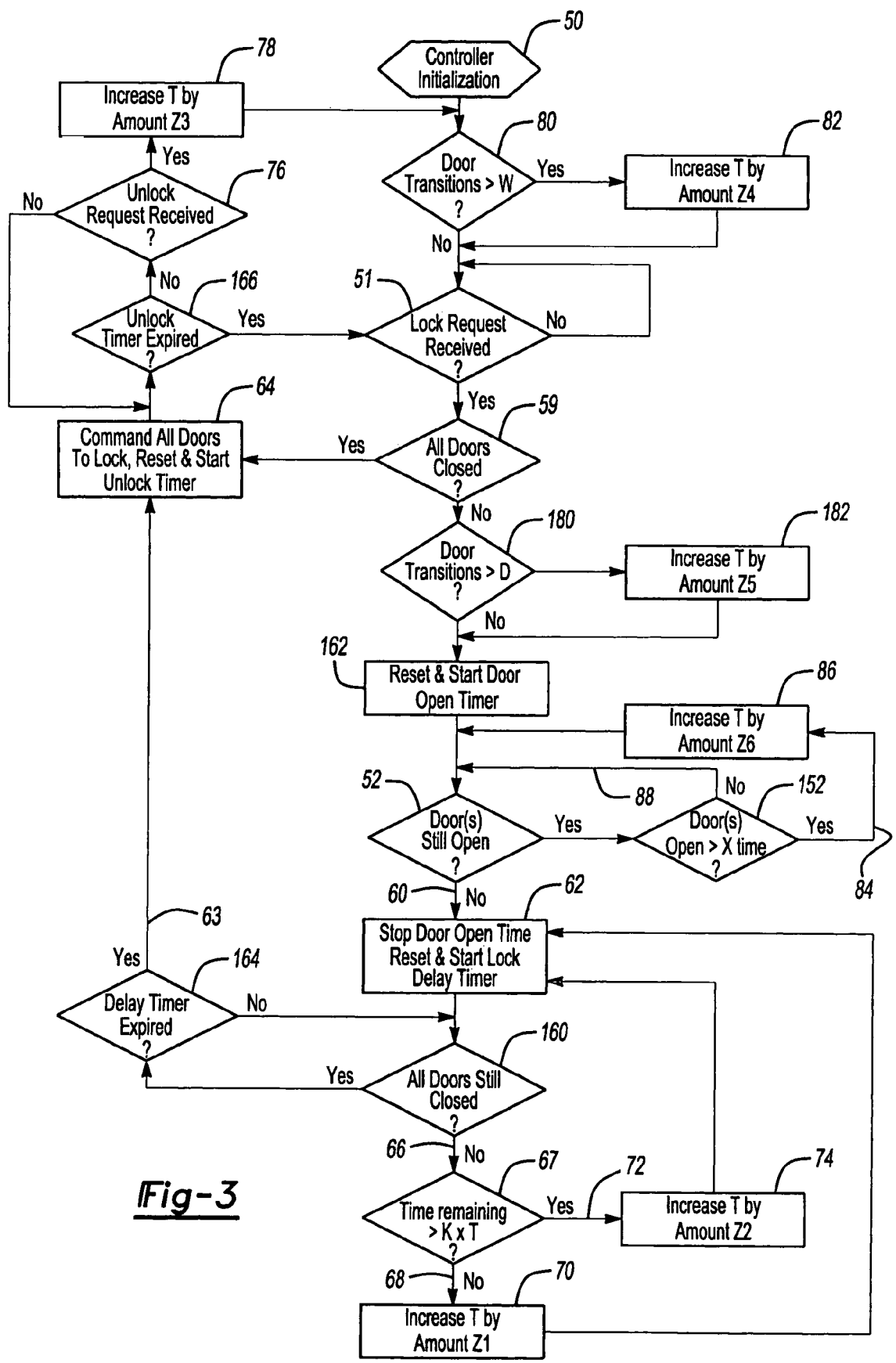
FIG. 3 illustrates, in a flow chart format, a process in accordance with an embodiment of the invention.

The adaptive vehicle locking system, in accordance with various embodiments of the invention, can be understood by reference to the flow chart of FIG. 3 and with continued reference to FIGS. 1 and 2. In accordance with these embodiments, adaptive lock actuation is initiated by initialization of the control module (step 50). Adaptive lock actuation in the body control module is activated when a lock request is made (step 51). Upon receiving a lock request, the body control module determines, in response to signal(s) received from one or more of the sensors, whether all of doors 12, 14, 16, or 18 are closed (step 59). If all of the doors are closed, the control module sends a signal commanding all doors to lock and starting a door unlock timer (step 64). If one or more doors is open, the control module starts a door open timer (step 162) and continues to monitor the door open status (step 52). As will be explained more fully below, there may be other intervening steps, in accordance with further embodiment of the invention, between steps 59 and 52. As soon as the body control module senses, again in response to signal(s) received from one or more of the sensors, that the last open door is closed (step 60), the door open timer is stopped and a lock delay timer in the body control module begins counting down from an adaptive lock delay time limit T, which is originally set at a predetermined lock delay time T1 (for example, five seconds) (step 62). The body control module continues to monitor the status of the vehicle doors (step 160) and the status of the lock delay timer (step 164). If no doors are opened before time T elapses and the body control module timer times out (e.g., reaches zero) (step 63), body control module 20 sends a signal causing door locks 22, 24, 26, and 28 to lock and causes the resetting to zero and starting of a door unlock timer (step 64). If, however, a door or doors are opened before time T elapses (step 66), the body control module receives a signal from the sensor associated with that door or doors, notes which door is opened, and adds additional amounts of time Z to the initial lock delay time limit T1 set on the lock delay timer. These additional amounts of time, Z, may be positive or negative in sign. Both the sign and magnitude of these additional amounts of time vary depending on conditions discussed in detail below. Each time these additional amounts of time are added to or subtracted from the time limit, T, the new lock delay time limit for the open door becomes the sum of these amounts of time, plus the previous time limit, $T_{old}$; $T=T_{old}+Z$. When a door is closed, the body control module stores this new lock delay time limit for that specific door in its memory, resets the lock delay timer, and starts counting down from this new lock delay time limit or from a lock delay time limit already saved in its memory.

Each time the adaptive vehicle locking system is activated, the body control module saves both the order of doors being opened and the lock delay time limit calculated for each individual door in its memory. Each time different doors are opened (or the doors are opened in a different order) the body control module saves a new record for the door opening order and the lock delay time limits T calculated for each door. If the adaptive actuation system is being used for the first time, or if the pattern of door opening does not match that in an already saved record, the procedure outlined below is followed and a new saved record is created. If the door opening matches a pattern in a pre-existing record, however, the system uses the saved lock delay time limits and modifies each saved, individual door lock delay time limit according to the procedure also outlined below.

Again with reference to the flow chart in FIG. 3 and with continued reference to FIGS. 1 and 2, if a door is opened before a lock delay time limit T has expired (step 66), the body control module notes which door is opened and an additional amount of time Z (either positive or negative) is added to the lock delay time limit, T. If the amount of time left on the body control module lock delay timer $T_{remaining}$ is less than a certain percentage K (for example, twenty percent) of the time limit T, but before time T expires (step 68), an additional positive amount of time Z1 (for example, 0.5 seconds) is added to the lock delay time limit T (step 70). The new lock delay time limit T is the sum of the previous lock delay time limit $T_{old}$ plus Z1. Conversely, if $T_{remaining}$ is greater than that certain percentage K of T (step 72), an additional negative amount of time Z2 (for example, −0.5 seconds) is added to the lock delay time limit T (step 74). The new lock delay time limit T is the sum of the previous lock delay time limit $T_{old}$ plus Z2. When the door is closed (step 60), the body control module stores this new calculated lock delay time limit, and the identity of the door that was opened, in its memory. The body control module lock delay timer then begins counting down again from the new time limit, $T=T_{old}+Z1$ or $T=T_{old}+Z2$ (step 62) if no lock delay time limit is saved in the body control module memory for that door opening or for that order of door openings. If a saved lock delay time limit is present, then the timer begins counting down from that saved lock delay time limit. If the lock delay timer reaches zero (step 63), the body control module sends a signal causing the door locks to lock and causing an unlock timer to reset to zero and start (step 64).

If a door is opened before the lock delay timer reaches zero, however, the process just described is repeated.

If the body control module lock delay timer reaches zero and the vehicle's doors are locked (step 64), the control module monitors the status of the unlock timer (step 166). If an unlock request is made before the unlock timer times out, for example, six seconds after the doors lock, the body control module notes which door is subsequently opened (step 76). An additional positive amount of time Z3 (for example, 0.6 seconds) is then added to the lock delay time limit T (step 78). When the door is closed (step 60), the body control module timer begins counting down from the new time limit, $T=T_{old}+Z3$ (step 62).

In accordance with an additional embodiment of the invention, the body control module tracks the number of door transitions (door openings and closings) after controller initiation but prior to a lock request being made when a door is open. If the number of door transitions exceeds a predetermined number W (for example, two) (step 80), then an additional amount of time Z4 (for example, 0.5 seconds) is added to the lock delay time limit T (step 82). When a lock request is subsequently made with a door open, the lock delay time limit that the lock delay timer of the body control module counts down from after the door is closed is $T=T_{old}+Z4$ (step 62), where $T_{old}$ is the time limit that would have applied absent the multiple door transitions.

In accordance with yet another embodiment of the invention, the body control module tracks the number of door transitions (step 180) between the lock request (step 51) when a door is open and lock activation (step 64). If more than a predetermined number of door openings or openings and closings occur between the lock request (made when a door is open) and the lock activation, an additional amount of time is added to the lock delay time limit (step 182). If the number of door openings or door openings and closings D (for example, three) is exceeded, then an additional amount of time Z5 (for example, 0.4 seconds) is added to the lock delay time limit T. When the last open door is closed, the body control module lock delay timer begins counting down from the new lock delay time limit, $T=T_{old}+Z5$.

In accordance with a still further embodiment of the invention, additional amounts of time are added to the lock delay time limit T if a door, opened between the lock request and lock activation, is open for an extended length of time. A door open timer in the body control module is reset to zero and started (step 162) when the lock request is received. The body control module tracks status of the open doors (step 52) and the length of time a door is open (step 152), and if the door is open longer than a predetermined 'door open' time limit X (for example, ten seconds) (step 84), an additional amount of time Z6 (for example, 0.8 seconds) (step 86), is added to the lock delay time limit T. The additional amount of time, Z6, is added to the lock delay time limit in addition to either Z1 or Z2. When the door is closed (step 60), the body control module lock delay timer begins counting down from the new lock delay time limit, $T=T_{old}+Z6$ (+Z1 or+Z2) (step 62). If the time the opened door is open does not exceed X, then no additional amount of time is added to the lock delay time limit T (step 88).

Figure 4:
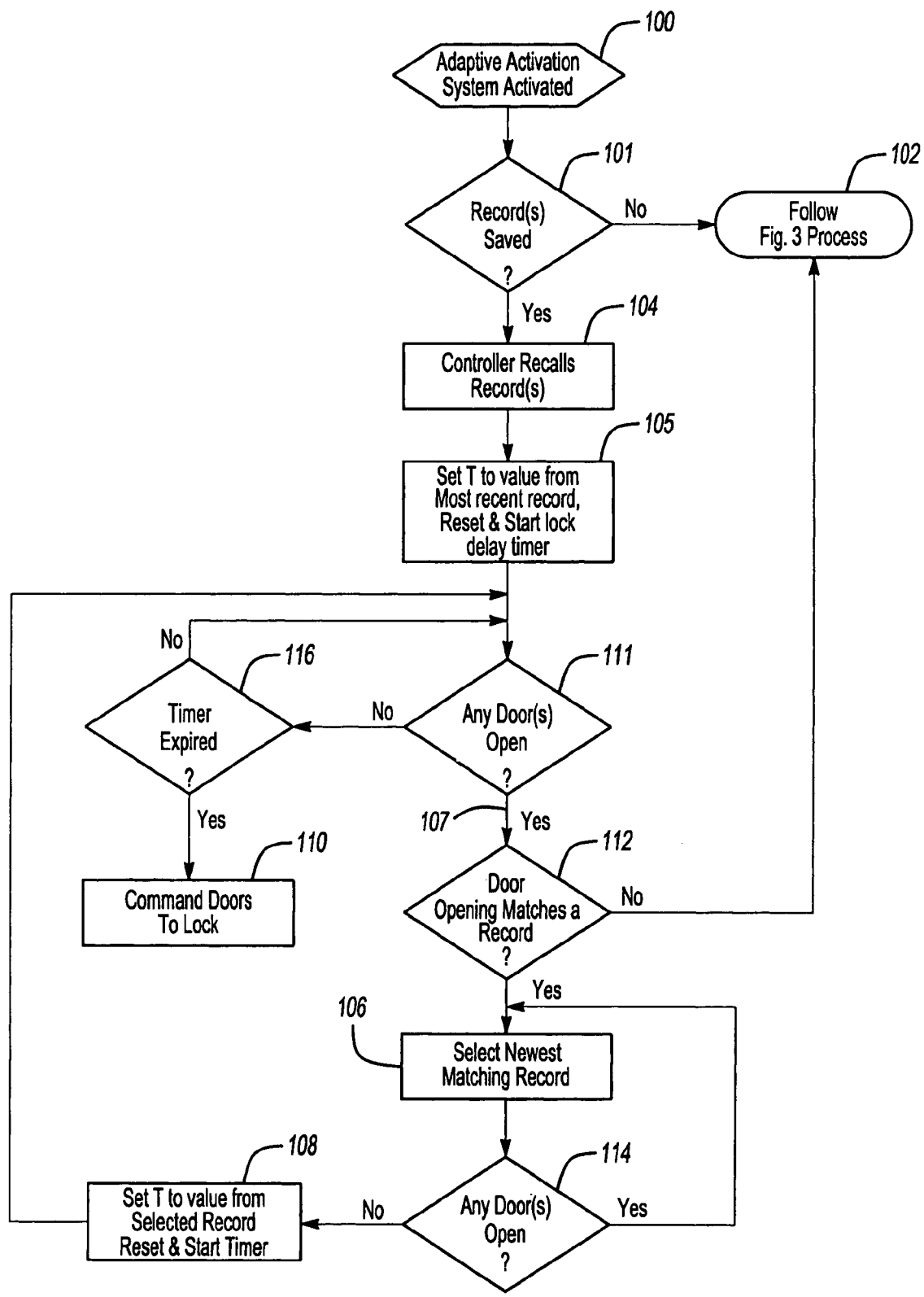
FIG. 4 illustrates, in a flow chart format, a process in accordance with a further embodiment of the invention.

FIG. 4 illustrates, again in flow chart format and with continued reference to FIGS. 1, 2, and 3, an adaptive locking process, in accordance with an embodiment of the invention, when records indicative of prior door opening/closing history have been saved in the memory of the body control module. When the adaptive actuation locking system is activated (step 100), the body control module checks for the presence of saved records (step 101). If there are no saved records, the process described above and illustrated in FIG. 3 is utilized (step 102). If, however, a record or records have been saved, the body control module reviews the door opening order and lock delay time limit calculated for each door (step 104) in these saved records. The lock delay time limit, T, is selected from the newest (most recent) record, and the body control module lock delay timer begins counting down from this stored lock delay time limit (step 105) as soon as the last open door is closed following a lock request. The body control module monitors the opening of any of the vehicle doors (step 111). As soon as a door opens (step 107), the body control module determines whether that door opening matches a stored record (step 112), and again selects the newest record (if there are multiple records) that begins with the opening of that particular door (step 106). If no records exist with that particular door opening first, the body control module reverts to using the process illustrated in FIG. 3 (step 102). As soon as the door closes, the lock delay time limit is modified for that particular door according to the process described above and illustrated in FIG. 3 and the time limit and door opening/closing history is saved to that record. The body control module continues to monitor the opening of any doors of the vehicle (step 114). When the last door is closed, the lock delay timer is reset and begins counting down from the next, preset time limit for whatever door is next in the order listed in the same saved record that the body control module had previously selected (step 108). Thus, the new lock delay time that the lock delay timer counts down from is not the modified time limit that was just saved to the body control module memory (as is the case when a new record is created), but rather is the preset, already saved lock delay time that was previously determined. If another door is opened, the body control module recalls the most recent record corresponding to the door opening and order that has taken place (step 106). If the door opening and order exactly matches that in a saved record, the body control uses the saved time limits for the various doors and modifies the individual times according to the process illustrated in FIG. 3. If, however, a door is opened that is not in any saved record, or is opened in a different order than listed in any saved record, the body control module reverts back to the process illustrated in FIG. 3 and creates a new record (step 102). If no new doors are opened, and the lock delay timer reaches zero (step 116), all the doors of the vehicle are locked (step 10).

The following non-limiting example illustrates operation of the adaptive vehicle locking system in accordance with one embodiment of the invention. Consider a driver who exits the vehicle and implements a lock request either by pushing the power door lock switch, keying the door lock or by depressing the appropriate button on a remote transmitter. After closing the vehicle door, the adaptive locking system is activated. If there is no history of door opening/closing stored in the memory of the body control module, the locking system defaults to the preset delayed locking time T (say, 5 seconds) before the doors of the vehicle are locked. If there is a stored record, however, the body control module searches memory for the most recent saved record. For example, suppose the most recent saved record in the memory of the body control module provided a lock delay time limit of 5.5 seconds from the time door 12 was closed until door 14 was opened and a lock delay time limit of 4.5 seconds from the time door 14 was closed and door 18 was opened. Given that historical record, the first lock delay time limit the lock delay timer counts down from is 5.5 seconds after the last open door is closed following lock request. If door 14 is opened within 5.5 seconds, the body control module continues using the lock delay times from this saved record although the stored time limit of 5.5 seconds associated with the opening of door 14 may be modified in accordance with the conditions illustrated in FIG. 3. After door 14 is closed, the body control module lock delay timer begins counting down from 4.5 seconds (the next saved lock delay time on that record). If door 18 is opened within 4.5 seconds, the body control module continues using this saved record, although the stored lock delay time limit of 4.5 seconds associated with the opening of door 14 may be modified in accordance with the conditions illustrated in FIG. 3. After door 18 is closed, the body control module lock delay timer again counts down from 4.5 seconds (the last saved time on that record). If a door is not opened before the lock delay timer times out, all the doors are locked. If, however, another door is opened before the passage of 4.5 seconds (or if an unlock request is made within the predetermined time period following the lock activation), the process illustrated in FIG. 3 is followed and a new saved record is created. During this process, if any door is opened out of order, or a door not in the saved record is opened (for example, door 16), then the process illustrated in FIG. 3 is followed and a historical record is created and saved.

In accordance with an additional embodiment of the invention, multiple keys 40 or wireless transmitters 34 that are personalized to a particular individual may be used with adaptive actuation vehicle locking system 19. Each of the keys or transmitters may be distinguishable by body control module 20 such that the control module associates the individual keys or transmitters with individual system users. In accordance with this embodiment, the body control module saves historical records of door openings/closings associated with a particular key or transmitter and matches those records to a particular user. Only the saved records pertaining to a specific user are accessed when the key or transmitter associated with that individual is used in locking the vehicle. Accordingly, the body control module can tailor the time limit between lock request and lock activation to specific users.

While exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in the exemplary embodiments without departing from the scope of the invention as set forth in the appended claims.

The invention claimed is:

1. An adaptive vehicle locking system comprising:
   a plurality of vehicle door locks, each configured to lock and unlock in response to a first type of signal;
   a plurality of sensors, each configured to sense opening and closing of an associated vehicle door and to send second signals indicating an opening and the delay between the opening and a closing of the associated vehicle door;
   a lock requester configured to send a third signal; and
   a control module configured to receive the second signals from the plurality of sensors and the third signal from the lock requester, the control module comprising:
   a memory for storing a history of the second signals, and
   a timer configured to count down from a time limit set in response to the history of the second signals, wherein the control module is configured to send the first type signal to the plurality of vehicle door locks to cause the vehicle door locks to lock in response to timing out of the timer following receipt of the third signal.

2. The locking system of claim 1 wherein the lock requestor comprises a lock request mechanism selected from the group consisting of a power door lock, a wireless key fob, and a key.

3. A method for adaptively actuating a vehicle locking system for locking the doors of a vehicle, the method comprising the steps of:
   storing a history of vehicle door openings and closings including a pattern of door openings and a delay between an opening and a closing of each door opened;
   setting a timer to an adaptive door lock delay time in response to the history of vehicle door openings and closings;
   initiating a door lock request;
   starting the timer in response to the door lock request;
   locking the doors of the vehicle at the expiration of the delay time; and
   updating the stored history.

4. The method of claim 3 wherein the step of setting a timer comprises the steps of:
   setting the timer to a first delay time; and
   modifying the delay time in response to a pattern of vehicle door openings and closings following the door lock request.

5. The method of claim 3 further comprising the step of adding an increment of time to the adaptive door lock delay time following an unlock request within a predetermined length of time after the step of locking the doors.

6. The method of claim 3 wherein the step of initiating a door lock request comprises the steps of:
   opening at least one door of the vehicle;
   activating a lock request mechanism; and
   closing all doors of the vehicle.

7. A method for adaptively actuating a vehicle locking system for locking the doors of a vehicle, the method comprising the steps of:
   storing a history of vehicle door openings and closings including a pattern of door openings and a delay between opening and closing of each door opened;
   setting a timer to a delay time;
   initiating a door lock request;
   modifying the delay time in response to a pattern of vehicle door openings and closings following the door lock request;
   starting the timer in response to the door lock request;
   locking the doom of the vehicle at the expiration of the delay time; and
   further modifying the time delay in response to a change in the stored history.

8. The method of claim 7 wherein the step of further modifying comprises the steps of:
   increasing the time delay if a door is opened before the end of the time delay but within a predetermined percentage of the time delay; and
   decreasing the time delay if a door is opened before a predetermined percentage of the time delay.

9. The method of claim 7 further comprising the step of storing the change in stared history and the modified time delay.

10. A method for adaptively actuating a vehicle locking system for locking the doors of a vehicle, the method comprising the steps of:
- activating a lock request while at least one door of the vehicle is open;
- closing all doors of the vehicle;
- starting countdown of a delay timer from a first predetermined time stored in memory in response to the step of closing all doors;
- delaying locking of doors of the vehicle for at least the first predetermined time;
- resetting the delay timer to a second delay time greater than the first predetermined time by a first incremental time in response to a door being opened when the amount of time left on the delay timer is less than a predetermined fraction of the first predetermined time but is greater than zero;
- resetting the delay timer to a third delay time less than the first predetermined time by a second incremental time in response to a door being opened when the amount of time left on the delay timer is greater than a predetermined fraction of the first predetermined time;
- thereafter delaying locking of doors of the vehicle for at least the second delay time or the third delay time; and
- locking all doors if a door is not opened before the second delay time or the third delay time expires.

11. The method of claim 10 further comprising the step of storing in the memory the identity of the door opened and the second delay time or the third delay time in place of the first predetermined time.

12. The method of claim 10 further comprising the step of adding a third incremental time to either the second delay time or the third delay time if the door remains open for a time greater than a predetermined delay.

13. The method of claim 10 further comprising the step of adding a fourth incremental time to the first predetermined time if more than a predetermined number of doors are open or more than a predetermined number of door transitions occur before the step of activating a look request.

14. A method for adaptively actuating a vehicle locking system for locking the doors of a vehicle, the method comprising the steps of:
- providing a control module comprising a delay timer and a memory, the memory configured to store door opening/closing history, including sequence of door openings, times taken for door openings and time delays associated with door openings;
- activating a lock request while at least one door of the vehicle is open;
- closing all doors of the vehicle;
- accessing the memory to determine whether a door opening/closing history exists;
- setting the delay timer to a first predetermined delay time comprising a time retrieved from the memory if a door opening/closing history exists or to a preset time if no door opening/closing history exists;
- starting countdown of the delay timer from the first predetermined delay time;
- delaying locking of doors of the vehicle for at least a time equal to the first predetermined delay time;
- opening a first door after the step of starting countdown;
- resetting the delay timer to a second delay time stored in the memory if the door opening/closing history includes a history beginning with opening the first door or to a third delay rime if there is no door opening/closing history beginning with opening the first door, the second or third delay time calculated in response to the fraction of the first predetermined delay time remaining when the first door is opened;
- closing the first door and modifying the door opening/closing history to reflect the reset delay time; and
- locking all doors if a door is not opened before the delay counter counts to zero.

15. The method of claim 14 further comprising the steps of:
- opening a second door before the delay counter counts to zero;
- resetting the delay timer to a fourth delay time stored in memory if the door opening/closing history begins with opening the first door and then the second door or to a fifth delay time if there is no such door opening/closing history, the fourth or fifth delay times calculated in response to the fraction of the second or third delay times remaining when the second door is opened; and
- closing the second door and modifying the door opening/closing history to reflect the reset fourth or fifth delay time.

16. The method of claim 14 wherein the step of activating a lock request comprises a step selected from the group consisting of: turning a key in a lock and depressing a button on a wireless key fob.

17. The method of claim 16 wherein the steps of turning a key or depressing a button comprise turning a key personalized to a particular individual or depressing a button on a wireless key fob that is personalized to a particular individual.

18. The method of claim 17 wherein the step of providing a control module comprises the step of providing a control module comprising a memory configured to store door opening/closing history personalized to a particular individual and wherein the step of modifying the door opening/closing history comprises the step of modifying the door opening/closing history personalized to a particular individual in response to activating a lock request by turning a key personalized to a particular individual or depressing a button on a wireless key fob that is personalized to a particular individual.

19. An adaptive vehicle locking system comprising:
- a control module comprising:
  - a memory configured to store a history of door opening and closing sequences including door opening durations; and
  - an adaptive delay timer configured to count down from an adaptive delay time in response to the stored history;
- a plurality of sensors configured to sense door openings and closings and to send signals responsive to door openings and closings to the control module to update the history stored in the memory;
- a plurality of door locks coupled to the control module and lockable in response to a signal from the control module following a lock request and completion of count down by the delay timer.

20. The system of claim 19 wherein the delay timer is further configured to be reset to a further adaptive delay time in response to opening of a vehicle door.

* * * * *